UNITED STATES PATENT OFFICE.

HENRY H. BEERS, OF MIDDLEBURY, INDIANA.

ROOF-PAINT.

SPECIFICATION forming part of Letters Patent No. 268,382, dated December 5, 1882.

Application filed August 14, 1882. (Specimens.)

*To all whom it may concern:*

Be it known that I, HENRY H. BEERS, of Middlebury, in the county of Elkhart and State of Indiana, have invented certain new and useful Improvements in Roof-Paints; and I do hereby declare that the following is a full, clear, and exact description of the invention, which will enable others skilled in the art to which it appertains to make and use the same.

This invention relates to an improved fire and water proof paint compound; and it consists of the following ingredients, combined in the proportions stated, viz: gas-tar, one barrel; Wisconsin hematitic iron ore, twenty pounds; red lead, five pounds; sulphur, twenty-three pounds; alum, ten pounds; borax, one pound. The first three of these ingredients form the body of my improved paint, while the sulphur serves as a hardening ingredient. The alum and borax impart its anti-fire properties. These ingredients are to be thoroughly mixed and mingled by agitation or other means, and are then ready to be applied by a brush in the usual manner.

My improved paint is specially adapted for painting roofs, walls, &c., but may be used with good effect at any place desired.

Having thus described my invention, I claim and desire to secure by Letters Patent of the United States—

The herein-described paint compound, consisting of gas-tar, Wisconsin hematitic iron ore, red lead, sulphur, alum, and borax, in about the proportions specified.

In testimony that I claim the foregoing as my own I have hereto affixed my signature in presence of two witnesses.

HENRY H. BEERS.

Witnesses:
ED. L. D. FOSTER,
IRA J. WOODWORTH.